(12) United States Patent
Fukushima et al.

(10) Patent No.: US 12,081,125 B2
(45) Date of Patent: Sep. 3, 2024

(54) CONTROL CIRCUIT OF DC/DC CONVERTER, POWER SUPPLY CIRCUIT, AND ELECTRONIC DEVICE

(71) Applicant: ROHM Co., LTD., Kyoto (JP)

(72) Inventors: Shun Fukushima, Kyoto (JP); Tomohisa Shinozaki, Kyoto (JP); Tsutomu Ishino, Kyoto (JP)

(73) Assignee: ROHM Co., Ltd., Kyoto (JP)

( * ) Notice: Subject to any disclaimer, the term of this patent is extended or adjusted under 35 U.S.C. 154(b) by 262 days.

(21) Appl. No.: 17/805,503

(22) Filed: Jun. 6, 2022

(65) Prior Publication Data

US 2022/0393593 A1    Dec. 8, 2022

(30) Foreign Application Priority Data

Jun. 7, 2021    (JP) .................................. 2021-095453

(51) Int. Cl.
| | | |
|---|---|---|
| *H02M 3/158* | (2006.01) | |
| *H02M 1/00* | (2007.01) | |
| *H02M 1/08* | (2006.01) | |
| *H02M 1/32* | (2007.01) | |

(52) U.S. Cl.
CPC ......... *H02M 3/158* (2013.01); *H02M 1/0009* (2021.05); *H02M 1/0045* (2021.05); *H02M 1/08* (2013.01); *H02M 1/32* (2013.01)

(58) Field of Classification Search
CPC ............................. H02M 1/0045; H02M 3/158
See application file for complete search history.

(56) References Cited

U.S. PATENT DOCUMENTS

| | | | | |
|---|---|---|---|---|
| 8,786,247 | B2* | 7/2014 | Ishino ................... | H01M 10/44 307/151 |
| 9,337,735 | B2* | 5/2016 | Odaohhara ............... | G06F 1/26 |
| 9,685,858 | B2* | 6/2017 | Fukushima ........... | H02M 3/156 |
| 10,686,377 | B1* | 6/2020 | Lu .......................... | H02M 3/158 |
| 10,879,811 | B2* | 12/2020 | Fukushima ............. | H02M 1/32 |
| 2010/0123442 | A1* | 5/2010 | Peterson ............. | H02M 3/1588 323/282 |
| 2012/0049829 | A1* | 3/2012 | Murakami .............. | H02M 1/32 327/333 |
| 2012/0286756 | A1* | 11/2012 | Tsukiji .................... | H02M 1/32 323/284 |

(Continued)

FOREIGN PATENT DOCUMENTS

EP    3726341 A1 * 10/2020    ............. G06F 1/263

*Primary Examiner* — Sisay G Tiku
(74) *Attorney, Agent, or Firm* — CHIP LAW GROUP

(57) ABSTRACT

A control circuit of a boost DC/DC converter including a high side transistor and a low side transistor, includes a pulse modulator including a first error amplifier that amplifies an error between a reference voltage and a feedback signal corresponding to an output voltage of the converter, the pulse modulator being configured to generate a pulse signal with a pulse modulated, a logic circuit that generates a high side control signal and a low side control signal, and a load switch drive circuit that drives a load switch that is a PMOS transistor connected between the high side transistor and a load. The load switch drive circuit can make a switch between a first mode for fully turning on the PMOS transistor and a second mode for supplying a drive voltage corresponding to the output signal of the first error amplifier to a gate of the PMOS transistor.

16 Claims, 14 Drawing Sheets

(56) References Cited

U.S. PATENT DOCUMENTS

| | | | | |
|---|---|---|---|---|
| 2016/0254746 A1* | 9/2016 | Lerdworatawee | ...... | H02M 3/07 |
| | | | | 323/271 |
| 2018/0129234 A1* | 5/2018 | Melgar | .................. | G05F 1/575 |
| 2022/0407409 A1* | 12/2022 | Shinozaki | ............... | H02M 1/32 |
| 2022/0407419 A1* | 12/2022 | Fukushima | ............. | H02M 1/36 |
| 2022/0416666 A1* | 12/2022 | Kawano | .................. | H02M 1/36 |
| 2023/0116750 A1* | 4/2023 | Saccomanno | ......... | H02M 3/158 |
| | | | | 323/222 |
| 2023/0155475 A1* | 5/2023 | Zhang | ................. | H02M 1/0009 |
| | | | | 320/166 |

* cited by examiner

CONTROL CIRCUIT OF DC/DC CONVERTER, POWER SUPPLY CIRCUIT, AND ELECTRONIC DEVICE

CROSS REFERENCE TO RELATED APPLICATIONS

This application claims priority benefit of Japanese Patent Application No. JP 2021-095453 filed in the Japan Patent Office on Jun. 7, 2021. Each of the above-referenced applications is hereby incorporated herein by reference in its entirety.

BACKGROUND

The present disclosure relates to a direct-current/direct-current (DC/DC) converter.

A boost DC/DC converter (boost converter) is used to operate a device that may require a voltage higher than a power supply voltage. An input line and an output line of the boost DC/DC converter are electrically connected all the time through an inductor and a body diode of a high side transistor. Therefore, even when the boost DC/DC converter is stopped, a voltage equal to an input voltage is generated in the output line, and the voltage is supplied to a load.

To prevent the supply of voltage to the load when the boost DC/DC converter is stopped, a load switch is inserted between the high side transistor and the output line. Instead of the load switch, a high side switch is inserted between the input line and the inductor in some cases. The load switch or the high side switch can be turned off to prevent the generation of voltage in the output line when the boost DC/DC converter is stopped.

As a result of examination of the boost DC/DC converter including the load switch, the present inventors have recognized the following problems. Note that the problems should not be construed as general perception of those skilled in the art.

When an input voltage $V_{IN}$ of the boost DC/DC converter fluctuates and exceeds a target level $V_{OUT(REF)}$ of an output voltage $V_{OUT}$, a voltage $V_{IN}-V_F$ is generated in the output line. An overcurrent may be supplied to the load when the input voltage $V_{IN}$ is high.

In the boost DC/DC converter, a minimum value is set for the duty cycle of switching in some cases. In this case, when there is an overcurrent due to short to ground or other causes, it is difficult to reduce the duty cycle below the minimum value, and the overcurrent may continue to flow.

The present disclosure has been made in view of the problems, and it is desirable to provide a control circuit that can solve at least one of the problems.

SUMMARY

An embodiment of the present disclosure relates to a control circuit of a boost DC/DC converter including a high side transistor and a low side transistor. The control circuit includes a pulse modulator, a logic circuit, and a load switch drive circuit. The pulse modulator includes a first error amplifier that amplifies an error between a reference voltage and a feedback signal corresponding to an output voltage of the boost DC/DC converter, and the pulse modulator is configured to generate a pulse signal with a pulse modulated according to an output signal of the first error amplifier. The logic circuit generates a high side control signal and a low side control signal based on the pulse signal. The load switch drive circuit drives a load switch that is a p-channel metal-oxide semiconductor (PMOS) transistor connected between the high side transistor and a load. The load switch drive circuit is capable of making a switch between a first mode for fully turning on the PMOS transistor and a second mode for supplying a drive voltage corresponding to the output signal of the first error amplifier to a gate of the PMOS transistor.

Note that any combinations of the constituent elements as well as constituent elements and expressions obtained by exchanging the constituent elements and the expressions among methods, apparatuses, and systems are also effective as embodiments of the present technology.

According to an embodiment of the present disclosure, an overvoltage of the output voltage can be suppressed.

DETAILED DESCRIPTION OF THE PREFERRED EMBODIMENTS

Overview of Embodiments

Figure 1:
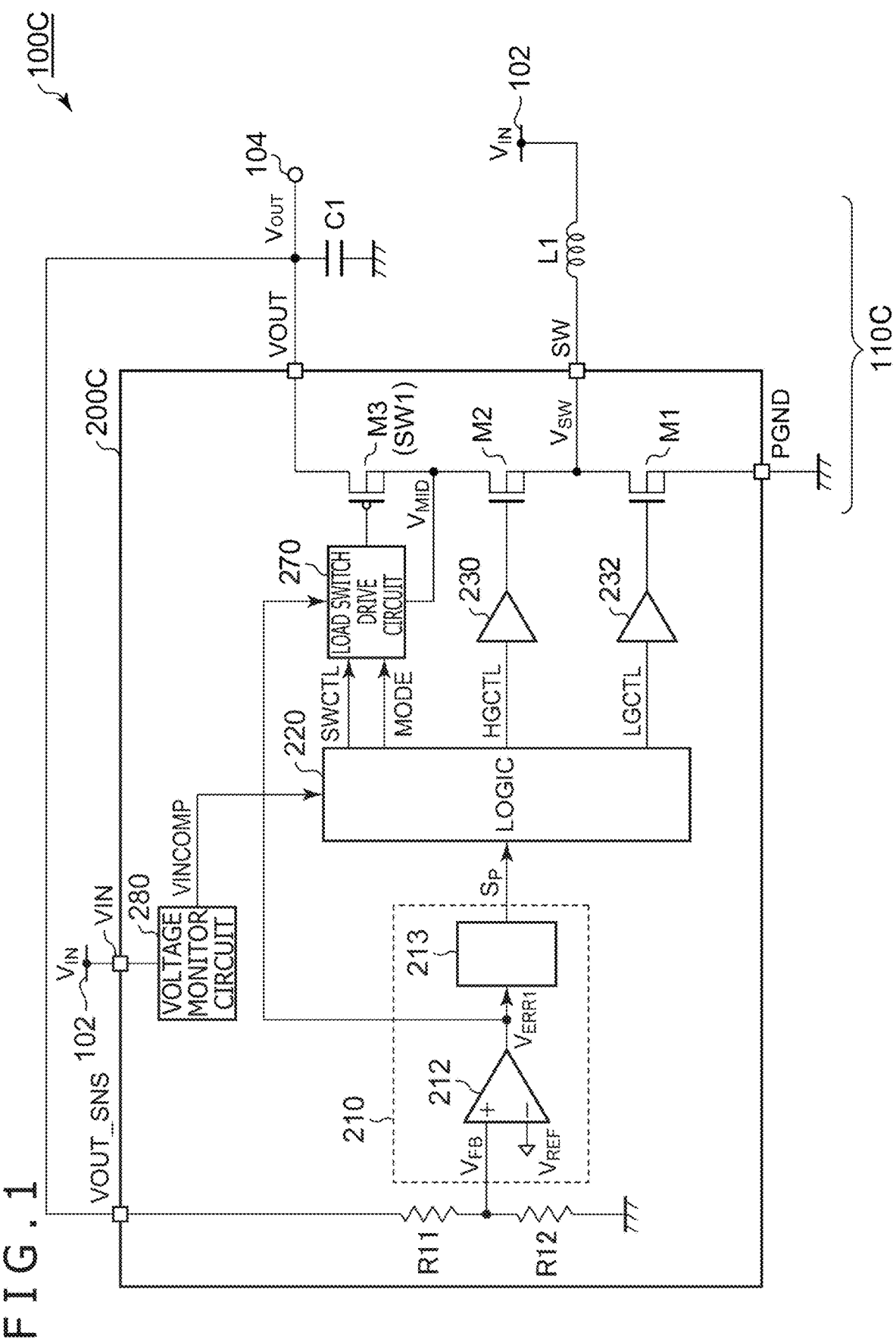
FIG. 1 is a circuit diagram of a boost DC/DC converter according to a first embodiment.

An overview of some exemplary embodiments of the present disclosure will be described. The overview simply describes some concepts of one or a plurality of embodiments for basic understanding of the embodiments as a preface to detailed explanation described later, and the overview does not limit the extent of the technology or the disclosure. For convenience, "one embodiment" may be used to indicate one embodiment (example or modification) or a plurality of embodiments (examples or modifications) disclosed in the present specification.

The overview is not a comprehensive overview of all conceivable embodiments, and the overview is not intended to specify important elements of all the embodiments or to define the scope of part or all of the embodiments. The sole purpose of the overview is to present a simplified form of some concepts of one or a plurality of embodiments as a preface to more detailed explanation presented later.

A control circuit according to an embodiment is used in a boost DC/DC converter including a high side transistor and a low side transistor. The control circuit includes a pulse modulator, a logic circuit, and a load switch drive circuit. The pulse modulator includes a first error amplifier that amplifies an error between a reference voltage and a feedback signal corresponding to an output voltage of the boost DC/DC converter, and the pulse modulator is configured to generate a pulse signal with a pulse modulated according to an output signal of the first error amplifier. The logic circuit generates a high side control signal and a low side control signal based on the pulse signal. The load switch drive circuit drives a load switch that is a PMOS transistor connected between the high side transistor and a load. The load switch drive circuit is capable of making a switch between a first mode for fully turning on the PMOS transistor and a second mode for supplying a drive voltage corresponding to the output signal of the first error amplifier to a gate of the PMOS transistor.

According to the configuration, when the load switch drive circuit operates in the second mode, the PMOS transistor, the first error amplifier, and the load switch drive circuit form a linear regulator (low drop output or LDO), and the output voltage can be stabilized at the target level. This can solve at least one of the problems that may occur in the boost DC/DC converter including a related-art load switch.

The linear regulator operates based on the output signal of the first error amplifier, and there is feedback such that the feedback signal approaches the reference voltage. Therefore, the output voltage can be stabilized at completely the same target level as the first mode.

In an embodiment, the load switch drive circuit may (i) enter the first mode when an input voltage of the boost DC/DC converter is lower than a predetermined threshold voltage and (ii) enter the second mode when the input voltage is higher than the threshold voltage. According to the configuration, the output voltage is stabilized at the target level even when the input voltage rises, and this can suppress an overvoltage.

In an embodiment, the control circuit may further include a first current detection circuit that generates a first current detection signal indicating a coil current flowing through an inductor of the boost DC/DC converter when the boost DC/DC converter performs a switching operation, and a second current detection circuit that generates a second current detection signal indicating a current flowing through the PMOS transistor when switching of the boost DC/DC converter is stopped. The pulse modulator may further include a second error amplifier that amplifies an error between the output signal of the first error amplifier and the first current detection signal, the pulse modulator may generate the pulse signal with a duty cycle corresponding to an output of the second error amplifier, the load switch drive circuit may include a third error amplifier that amplifies an error between the output signal of the first error amplifier and the second current detection signal, and the load switch drive circuit in the second mode may supply the drive voltage corresponding to an output signal of the third error amplifier to the gate of the PMOS transistor. By designing both the boost DC/DC converter and the linear regulator in the current mode, not only the first error amplifier but also a phase compensation circuit can be shared.

In an embodiment, the threshold voltage may be set in a range from 0.9 to 1.1 times a target level of the output voltage. More preferably, the threshold voltage may be set in a range from 0.95 to 1.05 times the target level of the output voltage.

In an embodiment, the threshold voltage may have hysteresis. This can prevent the operation from becoming unstable caused by the circuit going back and forth between the first mode and the second mode.

In an embodiment, both a higher threshold and a lower threshold of the threshold voltage having hysteresis may be higher than the target level of the output voltage. It is difficult for both the boost DC/DC converter and the linear regulator to maintain the output voltage at the target level in a range (referred to as a dead band) where the difference between the input voltage and the target level of the output voltage is small. According to the configuration, the circuit operates in the first mode in the dead band, and the drop of the output voltage below the target level can be prevented. This can prevent the load from becoming inoperable.

In an embodiment, both a higher threshold and a lower threshold of the threshold voltage having hysteresis may be lower than the target level of the output voltage. According to the configuration, the circuit operates in the second mode in the dead band, and the rise of the output voltage above the target level can be prevented. This can prevent generation of an overvoltage when, for example, the input voltage sharply rises.

In an embodiment, a higher threshold of the threshold voltage having hysteresis may be higher than the target level of the output voltage, and a lower threshold of the threshold voltage may be lower than the target level of the output voltage.

In an embodiment, the control circuit may further include a first overcurrent protection circuit that limits a coil current flowing through an inductor to prevent the coil current from exceeding a first threshold current, and a second overcurrent protection circuit that limits a current flowing through the PMOS transistor to prevent the current from exceeding a second threshold current in the second mode. The load switch drive circuit may enter the second mode when a duty cycle of the low side control signal has dropped to a minimum value and there is an overcurrent. If the circuit continues to operate in the first mode in a situation where the duty cycle has dropped to the minimum value in the overcurrent state, the overcurrent state continues. The second mode can be selected in such a situation to limit the output current.

In an embodiment, the second threshold current may be lower than the first threshold current. In this way, hysteresis of the first mode and the second mode can be set for a resistive load, and oscillation can be suppressed.

In an embodiment, the load switch drive circuit may transition to the first mode when the input voltage is lower than the threshold voltage and there is no overcurrent in the second mode.

In an embodiment, the load switch drive circuit may apply an on-voltage lower by a predetermined voltage range than a source voltage of the PMOS transistor to the gate of the PMOS transistor in the first mode.

In an embodiment, the load switch drive circuit may enter a third mode to stop the boost DC/DC converter and apply a voltage corresponding to an input voltage of the boost DC/DC converter to the gate of the PMOS transistor.

According to the configuration, the load switch (PMOS transistor) is not immediately turned off to stop the boost DC/DC converter. A voltage $V_C$ corresponding to the input voltage can be applied to the gate of the PMOS transistor to cause the PMOS transistor to operate as a source follower circuit (drain ground circuit). In this case, the source voltage of the PMOS transistor, that is, a voltage $V_{MID}$ at a connection node of the load switch and the high side transistor, is clamped to $$V_{MID} = V_C + V_{GS} \approx V_{IN} + V_{GS},$$

and this can prevent the generation of an overvoltage. A voltage $V_{SW}$ at a connection node (switching pin) of the high side transistor and the low side transistor is $$V_{SW} = V_{MID} + V_F = V_C + V_{GS} + V_F \approx V_{IN} + V_{GS} + V_F,$$

and the overvoltage of the switching pin is also suppressed. $V_F$ represents a forward direction voltage of a body diode of the high side transistor. In this case, a voltage $V_L$ across the inductor is as follows.

$$V_L = V_{IN} - V_{SW} = V_{IN} - (V_C + V_{GS} + V_F) \approx -(V_{GS} + V_F)$$

The coil current can thus be reduced with time at a slope of $-(V_{GS} + V_F)/L$.

In an embodiment, the load switch drive circuit may connect the gate of the PMOS transistor with an input pin to stop the boost DC/DC converter. In this way, the input voltage $V_{IN}$ can be applied to the gate of the PMOS transistor.

In an embodiment, the control circuit may further include a high side transistor, a low side transistor, and a PMOS transistor. The high side transistor, the low side transistor, and the PMOS transistor may be external discrete elements.

In an embodiment, a pin may not be provided on a connection node of the high side transistor and the PMOS transistor. The PMOS transistor of the load switch can be used to clamp the voltage $V_{MID}$ at the connection node of the high side transistor and the PMOS transistor. Therefore, a circuit element for suppressing the leap-up of the connection node is not necessary, and a pin for connecting the circuit element is not necessary.

In an embodiment, the control circuit may be integrated into one semiconductor substrate. The "integration" includes a case in which all of the constituent elements of the circuit are formed on the semiconductor substrate and a case in which main constituent elements of the circuit are integrated. Part of resistances, capacitors, and other elements for adjusting the circuit constant may be provided outside the semiconductor substrate. By integrating the circuit on one chip, the circuit area can be reduced, and the characteristics of the circuit elements can be kept uniform.

EMBODIMENTS

The present technology will now be described based on preferred embodiments and with reference to the drawings. The same signs are provided to the same or equivalent constituent elements, members, and processes illustrated in the drawings, and duplicate description will be appropriately omitted. The embodiments are exemplary, not intended to limit the technology. All features and combinations of the features described in the embodiments may not necessarily be essential for the technology.

In the present specification, "a state in which a member A and a member B are connected" includes a case in which the member A and the member B are physically and directly connected as well as a case in which the member A and the member B are indirectly connected through another member that does not substantially affect their electrical connection state and that does not impair the functions and the effects obtained by coupling them.

Similarly, "a state in which a member C is provided between a member A and a member B" includes a case in which the member A and the member C or the member B and the member C are directly connected as well as a case in which they are indirectly connected through another member that does not substantially affect their electrical connection state and that does not impair the functions and the effects obtained by coupling them.

In addition, "a signal A (voltage, current) corresponds to a signal B (voltage, current)" means that the signal A and the signal B are correlated, and specifically, it represents (i) a case in which the signal A is the signal B, (ii) a case in which the signal A is proportional to the signal B, (iii) a case in which the signal A is obtained by shifting the level of the signal B, (iv) a case in which the signal A is obtained by amplifying the signal B, (v) a case in which the signal A is obtained by inverting the signal B, or (vi) any combination of these, for example. Those skilled in the art will understand that the range of "corresponding" is determined according to the type and the usage of the signals A and B.

Vertical axes and horizontal axes of waveform diagrams and time charts referenced in the present specification are appropriately scaled up and down to facilitate the understanding, and each illustrated waveform is also simplified, exaggerated, or emphasized to facilitate the understanding.

First Embodiment

FIG. 1 is a circuit diagram of a boost DC/DC converter 100C according to a first embodiment. The boost DC/DC converter (hereinafter, simply referred to as a DC/DC converter) 100C boosts an input voltage $V_{IN}$ of an input terminal (input line) 102, stabilizes the input voltage $V_{IN}$ a predetermined voltage level, and supplies the input voltage $V_{IN}$ to a load (not illustrated) connected to an output terminal (output line) 104.

The DC/DC converter 100C includes a main circuit 110C and a control circuit 200C. The main circuit 110C includes an inductor L1, a low side transistor (switching transistor) M1, a high side transistor (synchronous rectifier transistor) M2, an output capacitor C1, and a load switch SW1.

The control circuit 200C is a functional integrated circuit (IC) integrated into one semiconductor substrate (die). In the present embodiment, the low side transistor M1, the high side transistor M2, and a PMOS transistor M3 are integrated into the control circuit 200C. The PMOS transistor M3 is provided as the load switch SW1.

The control circuit 200C includes a pulse modulator 210, a logic circuit 220, a high side driver 230, a low side driver 232, a load switch drive circuit 270, a voltage monitor circuit 280, and resistances R11 and R12 in addition to the low side transistor M1, the high side transistor M2, and the PMOS transistor M3.

The control circuit 200C is provided with a switching pin SW, a ground pin PGND, an input pin VIN, an output pin VOUT, and a sense pin VOUT_SNS.

The external inductor L1 is connected to the switching pin SW. The output capacitor C1 is connected to the output pin VOUT. The low side transistor M1 is connected between the switching pin SW and the ground pin PGND. The high side transistor M2 and the PMOS transistor M3 are directly connected between the switching pin SW and the output pin VOUT. The input voltage $V_{IN}$ of the DC/DC converter 100C is supplied to the input pin VIN.

The DC/DC converter 100C is a converter with constant voltage output, and the pulse modulator 210 generates a pulse signal $S_P$ with a pulse modulated to bring an output voltage $V_{OUT}$ of the DC/DC converter 100C close to a target level $V_{OUT(REF)}$.

The output voltage $V_{OUT}$ is fed back to the sense pin VOUT_SNS. The output voltage $V_{OUT}$ is divided by the resistances R11 and R12, and a feedback signal $V_{FB}$ indicating the output voltage $V_{OUT}$ is generated. The pulse modulator 210 includes a first error amplifier 212 and a pulse generator 213. The first error amplifier 212 amplifies an error between the feedback signal $V_{FB}$ and a reference voltage $V_{REF}$. The pulse generator 213 generates a pulse signal $S_P$ with a pulse modulated according to an output signal $V_{ERR1}$ of the first error amplifier 212.

The target level $V_{OUT(REF)}$ of the output voltage $V_{OUT}$ is represented by the following equation.

$$V_{OUT(REF)} = V_{REF} \times (R11+R12)/R12$$

The configuration and the control system of the pulse modulator 210 are not particularly limited. For example, the pulse modulator 210 may be a controller of voltage mode or may be a controller of peak current mode or average current mode. Alternatively, the pulse modulator 210 may be a controller of ripple control, such as hysteresis control (bang-bang control), bottom detection on-time fixed control, and peak detection off-time fixed control.

The modulation system of the pulse modulator 210 is not particularly limited. The modulation system may be pulse width modulation, pulse frequency modulation, or other modulation systems.

The logic circuit 220 generates a high side control signal HGCTL and a low side control signal LGCTL based on the pulse signal $S_P$. The logic circuit 220 also generates a control signal SWCTL for the PMOS transistor M3.

The high side driver 230 drives the high side transistor M2 based on the high side control signal HGCTL. The low side driver 232 drives the low side transistor M1 based on the low side control signal LGCTL.

The load switch drive circuit 270 drives the PMOS transistor M3 that is the load switch SW1 based on the control signal SWCTL. Specifically, the load switch drive circuit 270 turns on the PMOS transistor M3 when the control signal SWCTL is in an on level (for example, high) and turns off the PMOS transistor M3 when the control signal SWCTL is in an off level (for example, low).

The load switch drive circuit 270 can make a switch between two modes in a period in which the control signal SWCTL is in the on level (high). A control signal MODE for designating the mode is input to the load switch drive circuit 270.

The input pin $V_{IN}$ of the control circuit 200C is connected to the input line 102, and the input voltage $V_{IN}$ is input. The voltage monitor circuit 280 compares the input voltage $V_{IN}$ with a threshold voltage $V_{TH}$ and generates a comparison signal VINCOMP corresponding to the comparison result. It is assumed here that VINCOMP is high if $V_{IN} > V_{TH}$. The voltage monitor circuit 280 can include a voltage comparator.

The logic circuit 220 receives the comparison signal VINCOMP and puts the load switch drive circuit 270 into a first mode when the input voltage $V_{IN}$ of the boost DC/DC converter 100C is lower than the predetermined threshold voltage $V_{TH}$. The logic circuit 220 puts the load switch drive circuit 270 into a second mode when the input voltage $V_{IN}$ is higher than the threshold voltage $V_{TH}$. The threshold voltage $V_{TH}$ can be set to a voltage close to the target level $V_{OUT(REF)}$ of the output voltage $V_{OUT}$.

The load switch drive circuit 270 fully turns on the PMOS transistor M3 in the first mode. For example, the load switch drive circuit 270 generates a voltage lower by a predetermined voltage range ΔV than a source voltage $V_{MID}$ of the PMOS transistor M3 and supplies the voltage to the gate of the PMOS transistor M3. The predetermined voltage range ΔV is larger than a threshold voltage $V_{gs(th)}$ of the PMOS transistor M3.

The load switch drive circuit 270 in the second mode supplies a drive voltage $V_G$ corresponding to the output signal $V_{ERR1}$ of the first error amplifier 212 to the gate of the PMOS transistor M3.

Figure 2:
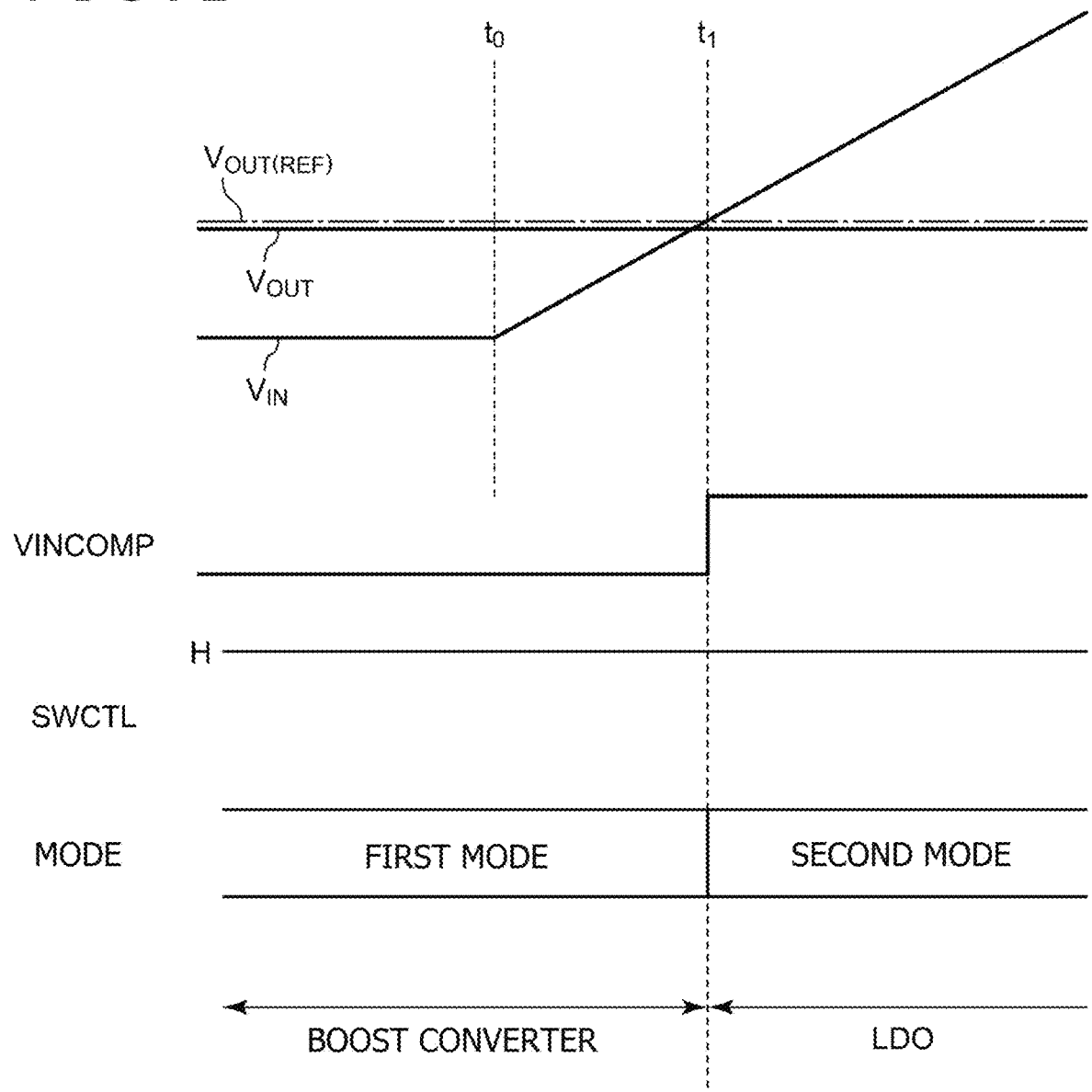
FIG. 2 is a diagram describing an operation of the DC/DC converter in FIG. 1.

This completes the description of the configuration of the control circuit 200C. Next, an operation of the control circuit 200C will be described. FIG. 2 is a diagram describing an operation of the DC/DC converter 100C in FIG. 1.

Before a time $t_0$, the input voltage $V_{IN}$ is lower than the threshold $V_{TH}$ (here, target level $V_{OUT(REF)}$ of output voltage), and the comparison signal VINCOMP is low. The DC/DC converter 100C as a boost converter is performing a switching operation. The load switch drive circuit 270 is in the first mode, and the PMOS transistor M3 is fully turned on.

The DC/DC converter 100C performs the switching operation based on the pulse signal $S_P$, and the output voltage $V_{OUT}$ is stabilized at the target level $V_{IN}$.

Once the input voltage $V_{IN}$ starts to rise after the time $t_0$, the duty cycle of the pulse signal $S_P$ starts to decrease. When the input voltage $V_{IN}$ drops to the target level $V_{OUT(REF)}$ at a time $t_1$, the switching stops. The comparison signal VINCOMP becomes high, and the load switch drive circuit 270 is switched to the second mode.

Once the load switch drive circuit 270 enters the second mode, the PMOS transistor M3, the first error amplifier 212, and the load switch drive circuit 270 form a linear regulator (LDO), and there is feedback such that the feedback signal $V_{FB}$ approaches the reference voltage $V_{REF}$. As a result, the output voltage $V_{OUT}$ is stabilized at the target level $V_{OUT(REF)}$.

This completes the description of the operation of the DC/DC converter 100C. According to the control circuit 200C, the output voltage $V_{OUT}$ is stabilized at the target level $V_{OUT(REF)}$ even if the input voltage $V_{IN}$ continues to rise, and this can prevent the supply of an overvoltage to the load.

The circuit area becomes large if dual error amplifiers are separately provided for the DC/DC converter and the linear regulator. In addition, it becomes difficult to make the target level of the output voltage of the DC/DC converter and the target level of the output voltage of the linear regulator completely the same if offset voltages of two error amplifiers are different. In the present embodiment, the first error amplifier 212 of the pulse modulator 210 is also used as an error amplifier of the linear regulator. Therefore, the target level of the output voltage of the DC/DC converter and the target level of the output voltage of the linear regulator can be the same.

Next, the threshold voltage $V_{TH}$ will be described. If the input voltage $V_{IN}$ fluctuates across the threshold voltage $V_{TH}$, the circuit goes back and forth between the first mode and the second mode, and the circuit operation becomes unstable. Therefore, it is desirable to add hysteresis to the threshold voltage $V_{TH}$.

Figure 3:
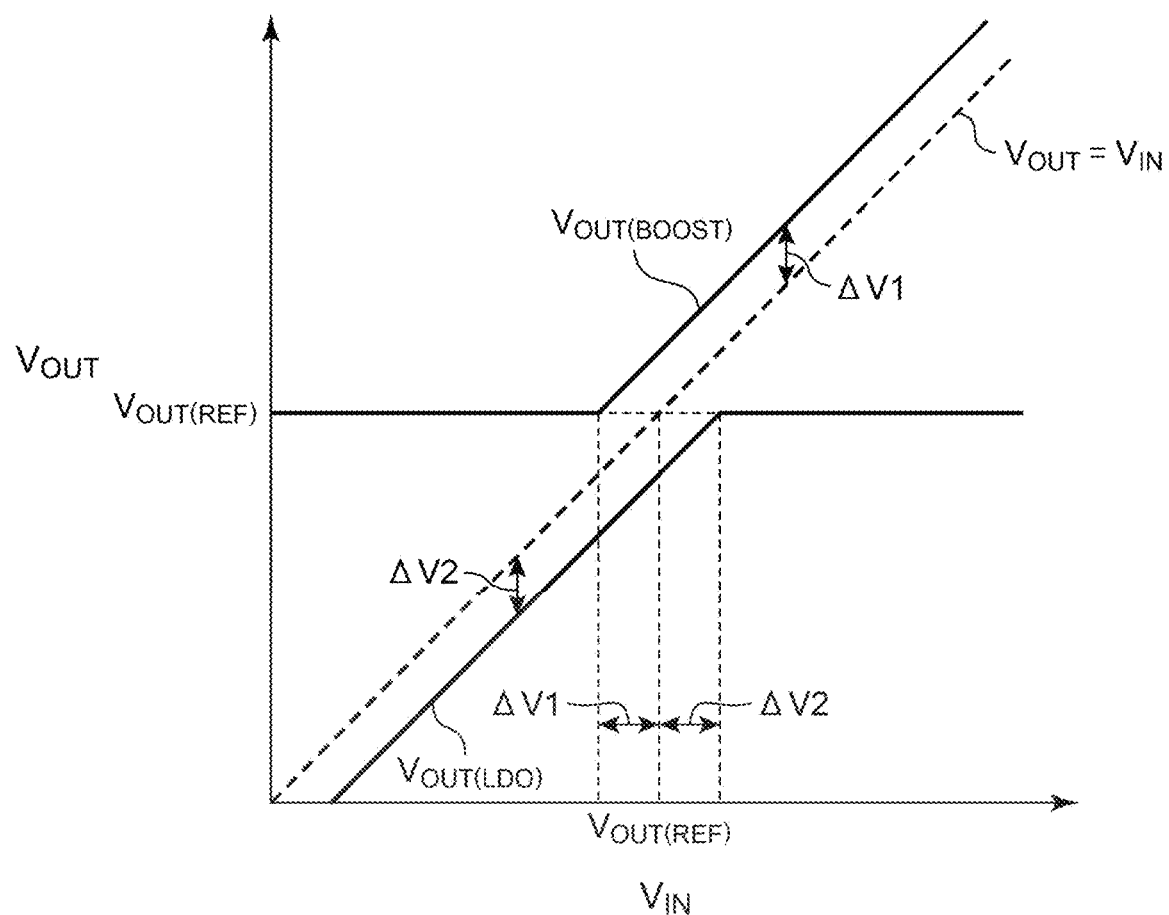
FIG. 3 depicts input-output characteristics of the boost DC/DC converter and a linear regulator.

FIG. 3 depicts input-output characteristics of the boost DC/DC converter and the linear regulator. It is difficult for the boost DC/DC converter to operate in a region narrower than the minimum duty cycle, and therefore, the lowest level of an output voltage $V_{OUT(BOOST)}$ of the boost DC/DC converter is $\Delta V1$ higher than the input voltage $V_{IN}$. That is, it is difficult for the boost DC/DC converter to output a voltage in a range from $V_{IN}$ to $V_{IN}+\Delta V1$.

On the other hand, the on-resistance of the PMOS transistor M3 is not zero in the linear regulator, and therefore, the highest level of an output voltage $V_{OUT(LDO)}$ of the linear regulator is $\Delta V2$ lower than the input voltage $V_{IN}$. That is, it is difficult for the linear regulator to output a voltage in a range from $V_{IN}$ to $V_{IN}-\Delta V2$.

Therefore, it is difficult for the DC/DC converter 100C to maintain the output voltage $V_{OUT}$ at the target level $V_{OUT(REF)}$ in a range from $V_{IN}-\Delta V2$ to $V_{IN}+\Delta V1$ regardless of whether the first mode or the second mode is selected. This will be referred to as a dead band.

Figure 4:
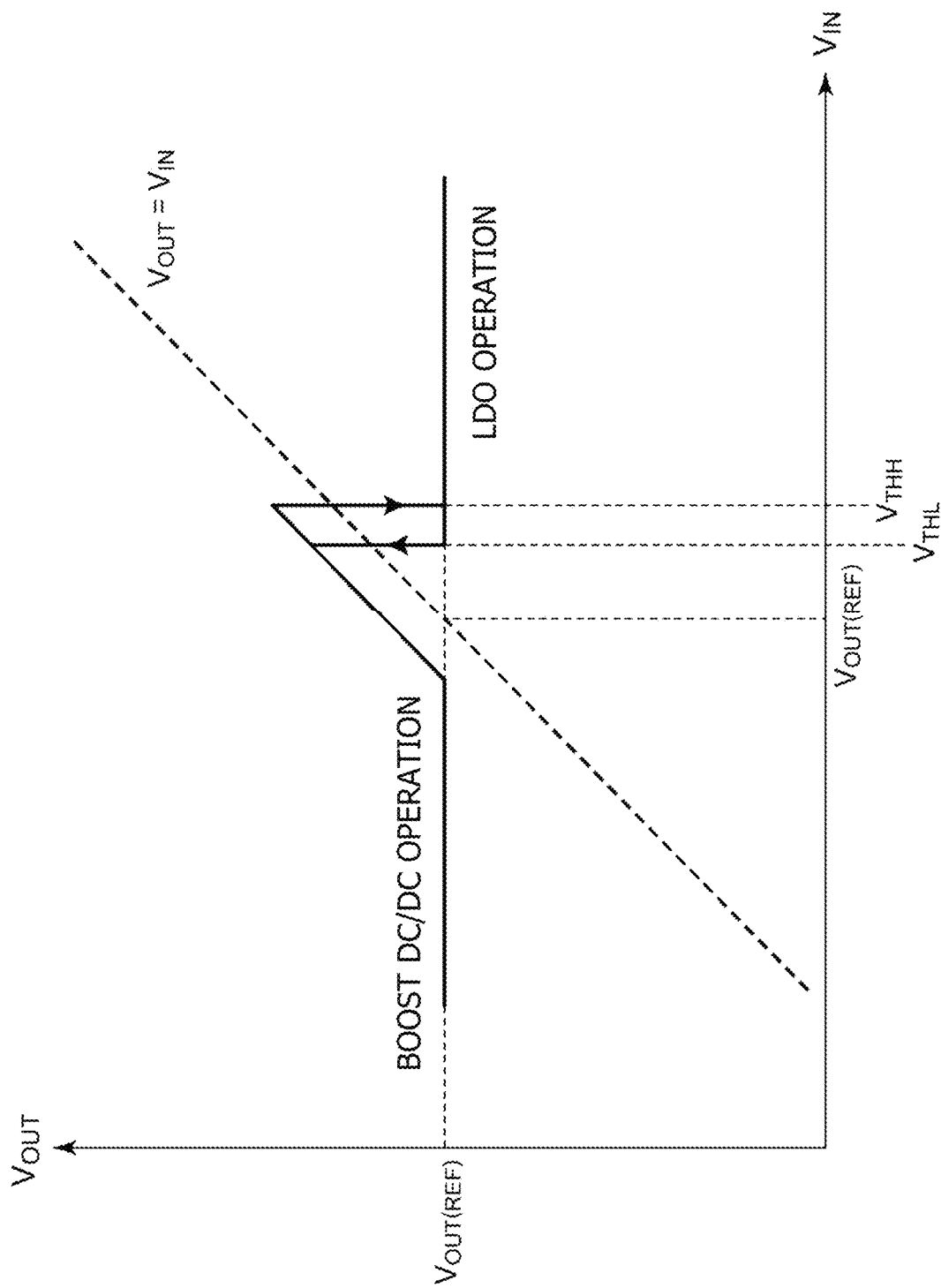
FIG. 4 is a diagram describing transition of an output voltage of the DC/DC converter.

In the case of providing hysteresis for the threshold voltage $V_{TH}$, both a higher threshold $V_{THH}$ and a lower threshold $V_{THL}$ may be set higher than the target level $V_{OUT(REF)}$. FIG. 4 is a diagram describing transition of the output voltage $V_{OUT}$ of the DC/DC converter 100C. In this case, the system operates as the boost DC/DC converter in the dead band, and it is guaranteed that the output voltage $V_{OUT}$ is higher than the target voltage $V_{OUT(REF)}$. This control is effective in preventing undershoot of the output voltage $V_{OUT}$.

Figure 5:
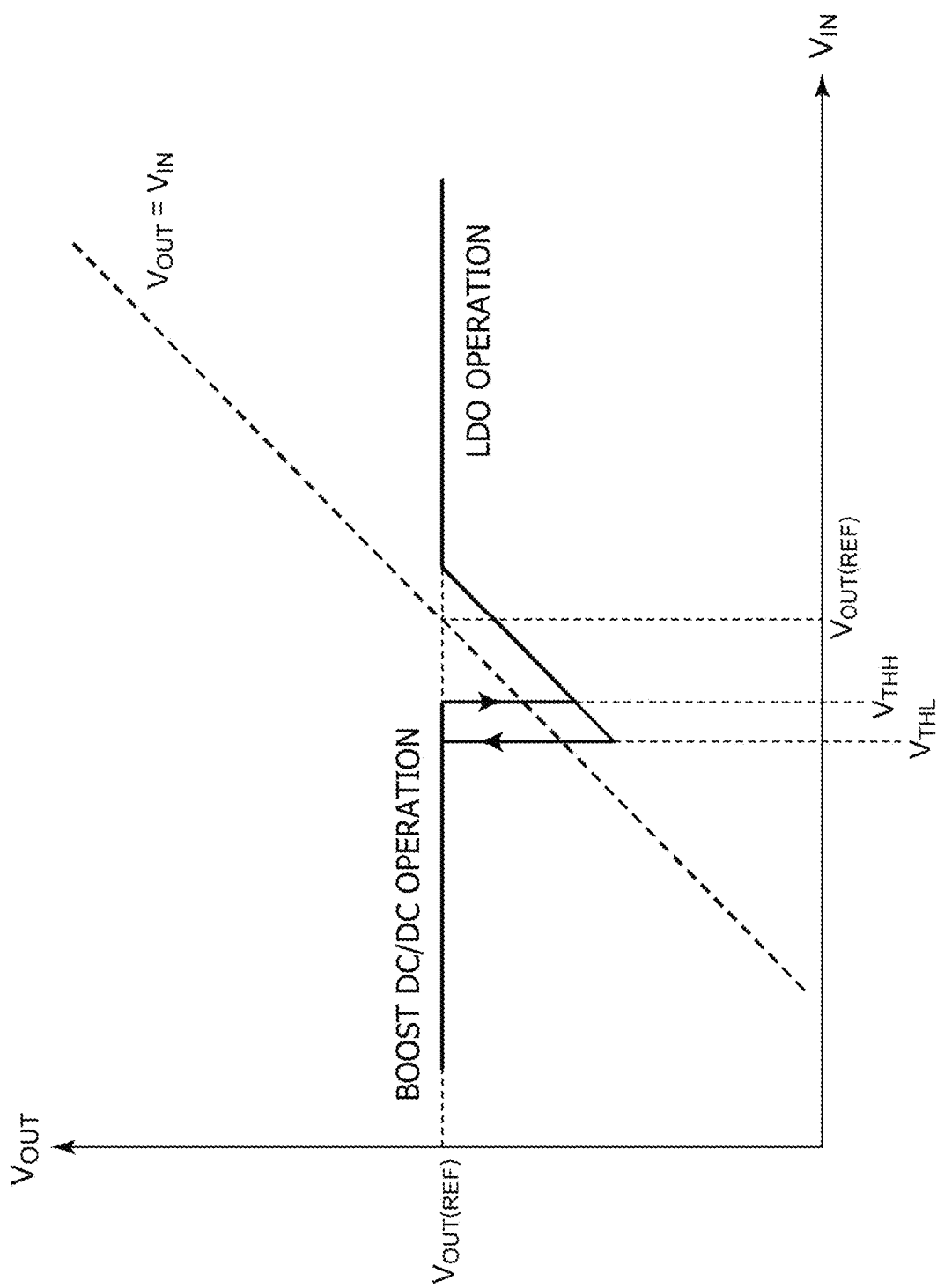
FIG. 5 is a diagram describing transition of the output voltage of the DC/DC converter.

In the case of providing hysteresis for the threshold voltage $V_{TH}$, both the higher threshold $V_{THH}$ and the lower threshold $V_{THL}$ may be set lower than the target level $V_{OUT(REF)}$. FIG. 5 is a diagram describing transition of the output voltage $V_{OUT}$ of the DC/DC converter 100C. In this case, the system operates as the linear regulator in the dead band, and the output voltage $V_{OUT}$ does not exceed the target voltage $V_{OUT(REF)}$. This control is effective in preventing overshoot of the output voltage $V_{OUT}$.

Figure 6:
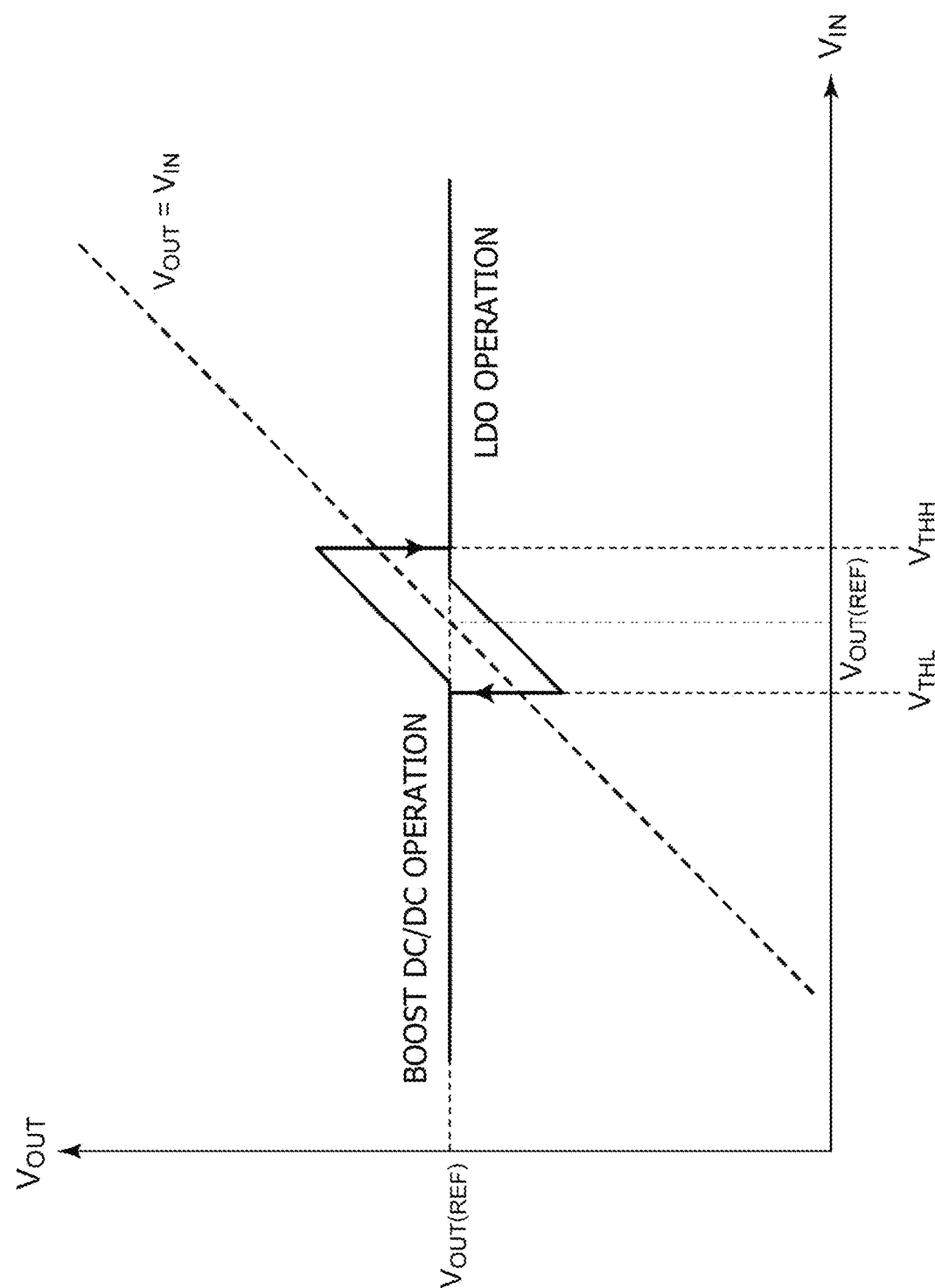
FIG. 6 is a diagram describing transition of the output voltage of the DC/DC converter.

In the case of providing hysteresis for the threshold voltage $V_{TH}$, the higher threshold $V_{THH}$ and the lower threshold $V_{THL}$ may be set across the target level $V_{OUT(REF)}$. FIG. 6 is a diagram describing transition of the output voltage $V_{OUT}$ of the DC/DC converter 100C. In this case, the system operates as the linear regulator and the boost DC/DC converter in the dead band. This control is effective in reducing both the amount of overshoot and the amount of undershoot.

Note that the closer the threshold voltage $V_{TH}$ to the target level $V_{OUT(REF)}$ is, the smaller the amount of overshoot and the amount of undershoot can be. From this point of view, the threshold voltage $V_{TH}$ may be set in a range of $V_{OUT(REF)} \times 0.9 < V_{TH} < V_{OUT(REF)} \times 1.1$, and more preferably, the threshold voltage $V_{TH}$ may be set in a range of $V_{OUT(REF)} \times 0.95 < V_{TH} < V_{OUT(REF)} \times 1.05$. The closer the threshold voltage $V_{TH}$ to the target level $V_{OUT(REF)}$ is, the more the fluctuation of the output voltage $V_{OUT}$ associated with the mode switch can be suppressed.

For example, $V_{THH}=1.03$ and $V_{THL}=1.02$ may be set for the case of FIG. 4. $V_{THH}=0.98$ and $V_{THL}=0.97$ may be set for the case of FIG. 5. $V_{THH}=1.01$ and $V_{THL}=0.99$ may be set for the case of FIG. 6.

Next, a specific configuration example of the control circuit 200C will be described.

Figure 7:
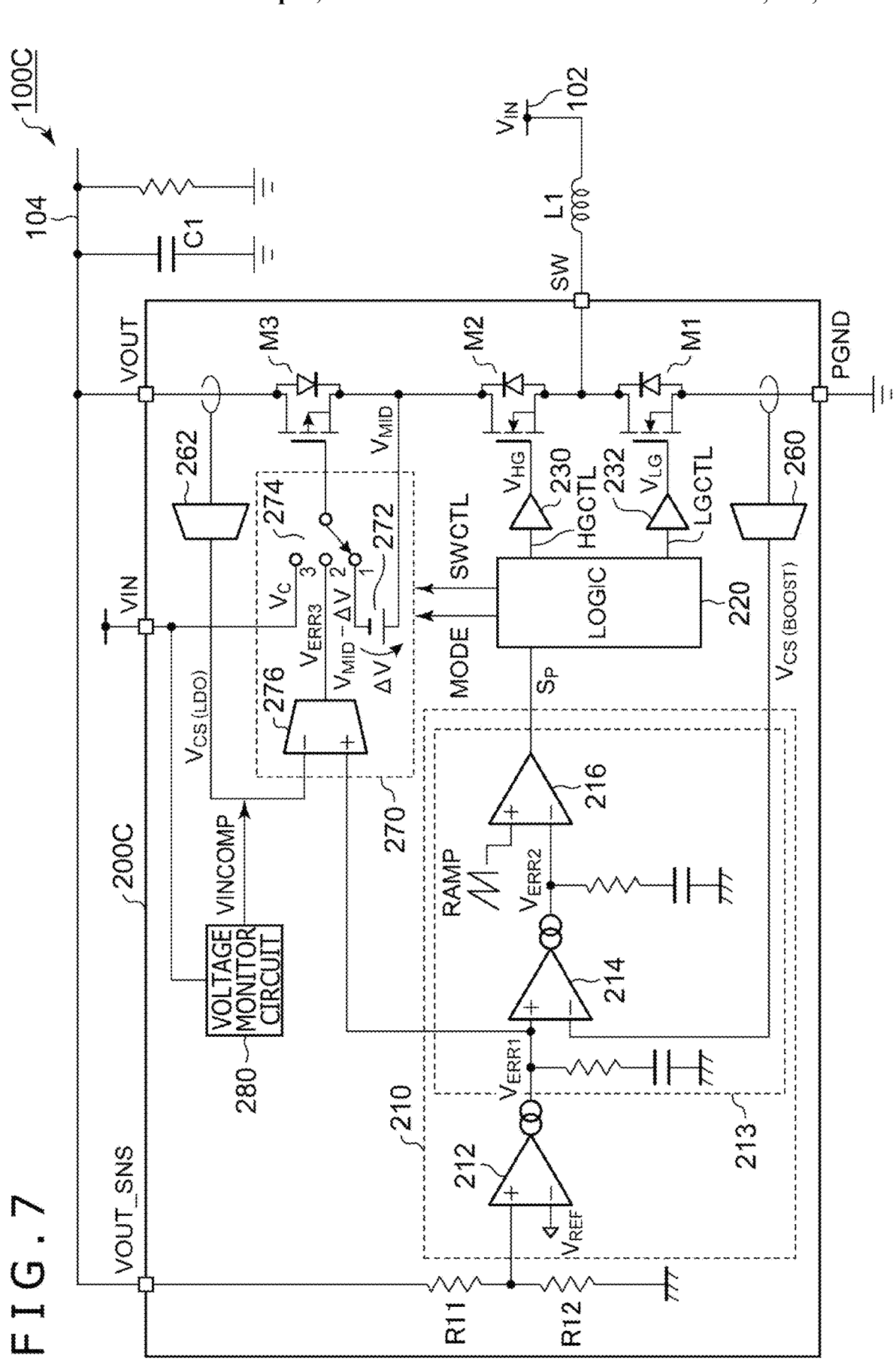
FIG. 7 is a circuit diagram of an example of a control circuit in the DC/DC converter.

FIG. 7 is a circuit diagram of an example of the control circuit 200C of the DC/DC converter. The pulse modulator 210 is a pulse width modulator of current mode. A first current detection circuit 260 generates a first current detection signal $V_{CS(BOOST)}$ indicating a coil current $I_L$ flowing through the inductor L1 when the boost DC/DC converter 100C performs the boost operation. The first current detection signal $V_{CS(BOOST)}$ may be based on the current flowing through the low side transistor M1 or may be based on the current flowing through the high side transistor M2. Alternatively, the first current detection circuit 260 may directly detect the coil current $I_L$.

The output signal $V_{ERR1}$ of the first error amplifier 212 is input as a target value (current command signal) of the current detection signal $V_{CS(BOOST)}$ to the pulse generator 213. The pulse generator 213 includes a second error amplifier 214 and a pulse width modulation (PWM) comparator 216. The second error amplifier 214 amplifies an error between the current command signal $V_{ERR1}$ and the current detection signal $V_{CS(BOOST)}$. The PWM comparator 216 compares an output signal $V_{ERR2}$ of the second error amplifier 214 with a periodic signal RAMP of ramp wave or sawtooth wave and generates a pulse signal $S_P$.

In the control circuit 200C of FIG. 7, the linear regulator formed by the PMOS transistor M3, the first error amplifier 212, and the load switch drive circuit 270 is provided in the current mode. A second current detection circuit 262 generates a second current detection signal $V_{CS(LDO)}$ indicating a current $I_{OUT(LDO)}$ flowing through the PMOS transistor M3.

The load switch drive circuit 270 includes a voltage source 272, a selector 274, and a third error amplifier 276.

The third error amplifier 276 amplifies an error between the current command signal $V_{ERR1}$, which is an output of the first error amplifier 212, and the second current detection signal $V_{CS(LDO)}$. The load switch drive circuit 270 in the second mode supplies a drive voltage corresponding to an output signal $V_{ERR3}$ of the third error amplifier 276 to the gate of the PMOS transistor M3. Specifically, the selector 274 in the second mode connects the output node of the third error amplifier 276 to the gate of the PMOS transistor M3.

The voltage source 272 in the first mode generates a gate voltage for fully turning on the PMOS transistor M3. Specifically, the voltage source 272 shifts the level of the source voltage $V_{MID}$ of the PMOS transistor M3 and generates a voltage ($V_{MID}-\Delta V$) lower by a predetermined voltage range $\Delta V$ than the source voltage $V_{MID}$. The selector 274 in the first mode selects the output voltage of the voltage source 272 and supplies the output voltage to the gate of the PMOS transistor M3.

The load switch drive circuit 270 enters a third mode to stop the DC/DC converter 100C. The load switch drive circuit 270 in the third mode applies a voltage $V_C$ corresponding to the input voltage $V_{IN}$ to the gate of the PMOS transistor M3. The case in which the voltage $V_C$ "corresponds to the input voltage $V_{IN}$" includes a case in which the voltage $V_C$ is generated by using the input voltage $V_{IN}$. This includes not only a case in which the voltage $V_C$ is equal to the input voltage $V_{IN}$, but also a case in which the voltage $V_C$ is a voltage obtained by shifting the level of the input voltage $V_{IN}$ in the positive or negative direction and a case in which the voltage $V_C$ is a voltage obtained by multiplying the input voltage $V_{IN}$ by a coefficient. It is assumed in the present embodiment that the voltage $V_C$ is equal to the input voltage $V_{IN}$. The selector 274 in the third mode connects the gate of the PMOS transistor M3 to the input pin $V_{IN}$.

The state of the selector 274 is controlled according to the switch control signal SWCTL and the comparison signal VINCOMP. The selector 274 selects the voltage $V_{MID}-\Delta V$ (first mode) when the switch control signal SWCTL is high (on level) and the comparison signal VINCOMP is in a first level (low). The selector 274 selects the voltage $V_{ERR3}$ (second mode) when the switch control signal SWCTL is high (on level) and the comparison signal VINCOMP is in a second level (high). The selector 274 selects the voltage $V_C=V_{IN}$ (third mode) when the switch control signal SWCTL is low (off level).

This completes the description of the configuration of the control circuit 200C. An advantage of the control circuit 200C will be described.

In the configuration example, both the boost DC/DC converter and the linear regulator operate in the current mode. The first error amplifier 212 can be shared, and a phase compensation circuit connected to the first error amplifier 212 (CR circuit connected to the output of the first error amplifier 212) also serves as a phase compensation circuit in the operation of the linear regulator. That is, there is an advantage that the phase compensation circuits do not have to be separately designed for the boost DC/DC converter and the linear regulator.

Figure 8:
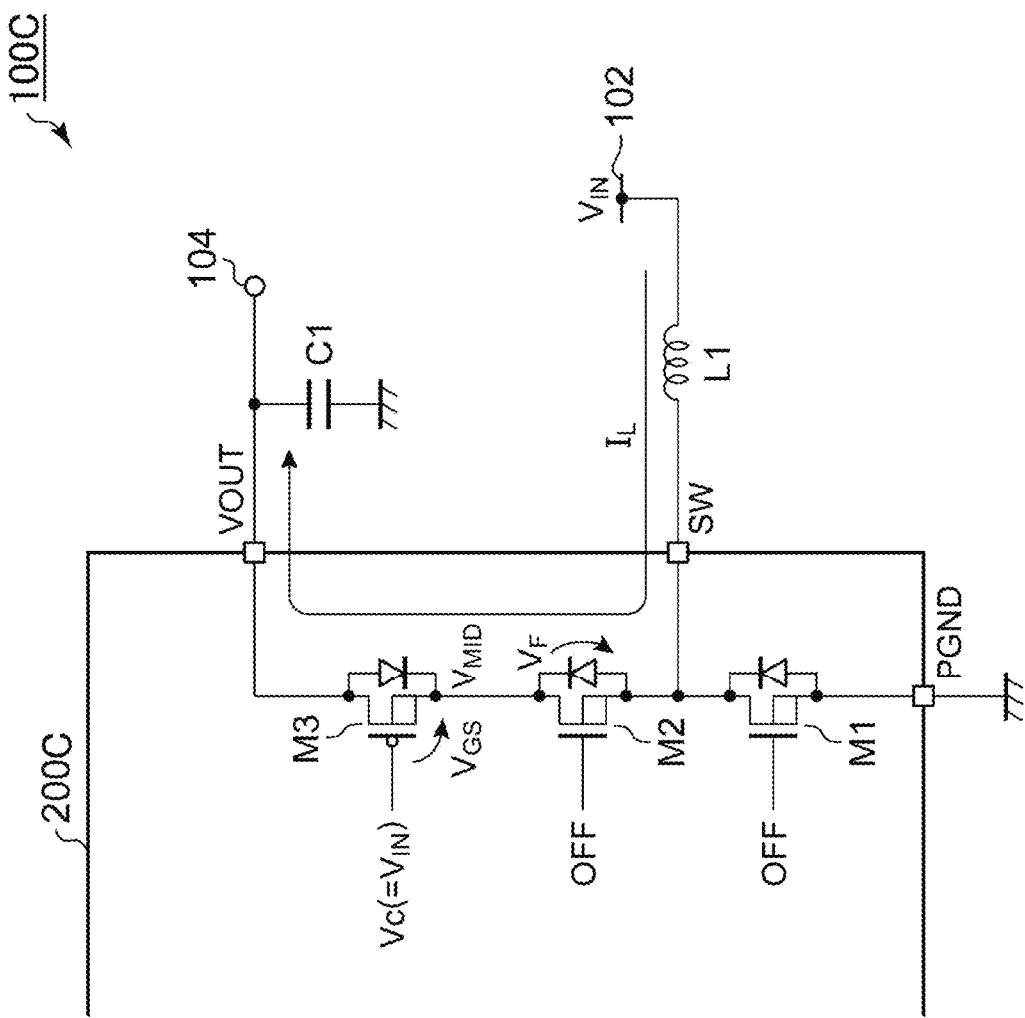
FIG. 8 is an equivalent circuit diagram of the DC/DC converter immediately after transition of a switch control signal to low.

Next, an advantage of the third mode will be described. The logic circuit 220 sets the switch control signal SWCTL to low when there is an event for stopping the output of the DC/DC converter 100C. FIG. 8 is an equivalent circuit diagram of the DC/DC converter 100C immediately after the switch control signal SWCTL has transitioned to low.

The load switch drive circuit 270 applies the voltage $V_C$ in the same voltage level as the input voltage $V_{IN}$ to the gate of the PMOS transistor M3. In this case, the PMOS transistor M3 is not immediately turned off, and the PMOS transistor M3 operates as a source follower circuit. As a result, a source voltage of the PMOS transistor M3, that is, a voltage $V_{MID}$ at a connection node of the load switch SW1 and the high side transistor M2, is clamped to $$V_{MID}=V_C+V_{GS},$$

and this can prevent generation of an overvoltage.

In this case, a voltage $V_{SW}$ of the switching pin SW as a connection node of the high side transistor M2 and the low side transistor M1 is $$V_{SW}=V_{MID}+V_F=V_C+V_{GS}+V_F\approx V_{IN}+V_{GS}+V_F,$$

and this suppresses an overvoltage of the switching pin SW.

In this case, a voltage $V_L$ across the inductor is $$V_L=V_{IN}-V_{SW}=V_{IN}-(V_C+V_{GS}+V_F).$$

When $V_C \approx V_{IN}$ is set as described above, $$V_L \approx -(V_{GS}+V_F)$$

is established. This can reduce the coil current $I_L$ with time at a slope of $-(V_{GS}+V_F)/L$. Subsequently, the coil current $I_L$ becomes zero.

Figure 9:
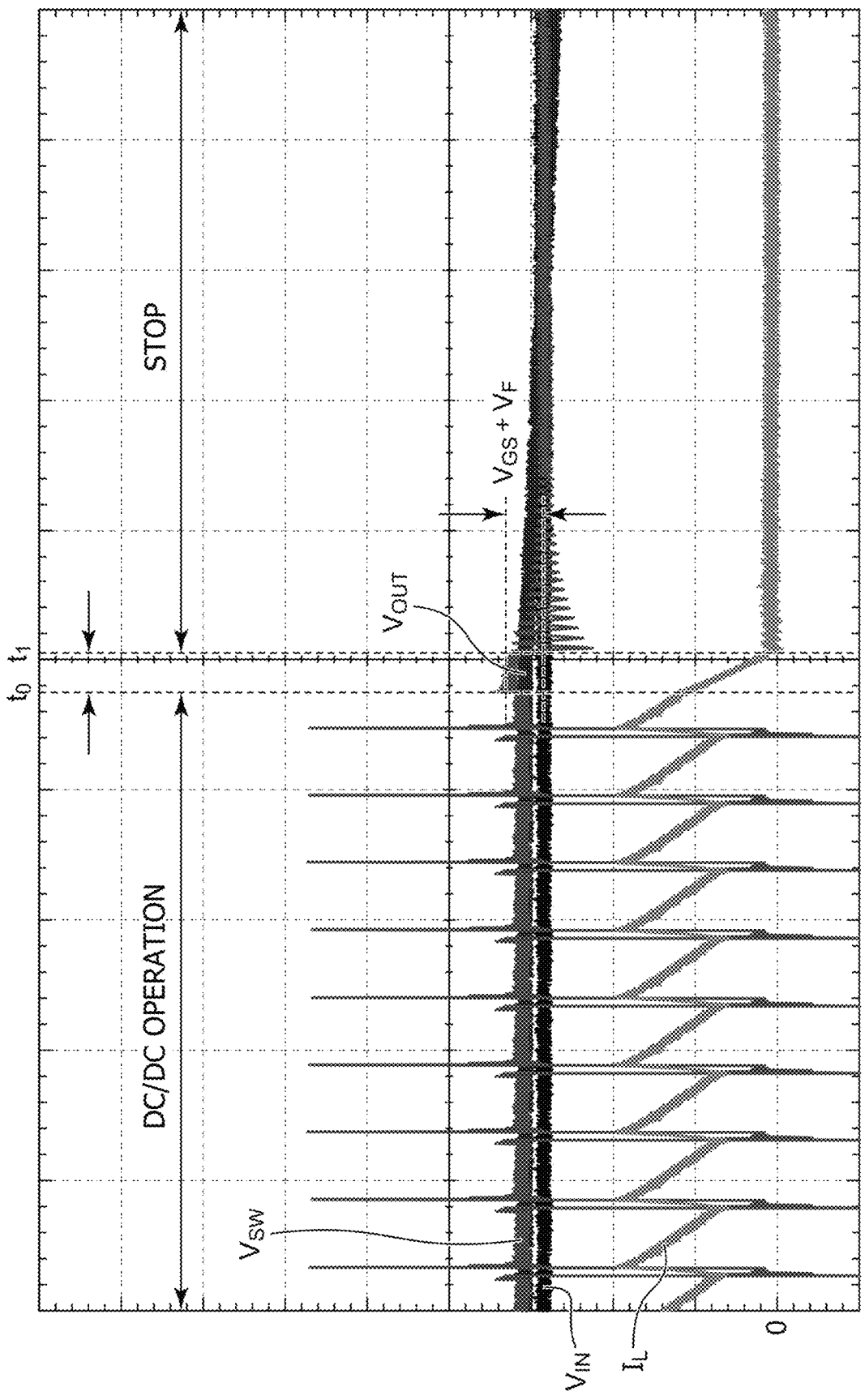
FIG. 9 is a waveform diagram (actual measurement) of the DC/DC converter in FIG. 7.

FIG. 9 is a waveform diagram (actual measurement) of the DC/DC converter 100C in FIG. 7. FIG. 9 illustrates the voltages $V_{SW}$, $V_{IN}$, and $V_{OUT}$ of the switching pin SW, the input pin $V_{IN}$, and the output pin VOUT, respectively, and the coil current $I_L$. The DC/DC converter 100C performs the switching operation before a time $t_0$, and the output voltage $V_{OUT}$ is stabilized at the target level $V_{OUT(REF)}$.

Once an event that triggers the stop is detected at the time $t_0$, gate voltages $V_{HG}$ and $V_{LG}$ of the low side transistor M1 and the high side transistor M2 are switched to the low level, and the voltage $V_C=V_{IN}$ is applied to the gate of the PMOS transistor M3. As a result, the switching voltage $V_{SW}$ is clamped to $V_{IN}+V_{GS}+V_F$. In this section, the coil current $I_L$ decreases at a slope (A/s) of $-(V_{GS}+V_F)/L$ and becomes zero at a time $t_1$. The output of the DC/DC converter 100C stops after the time $t_1$.

Figure 10:
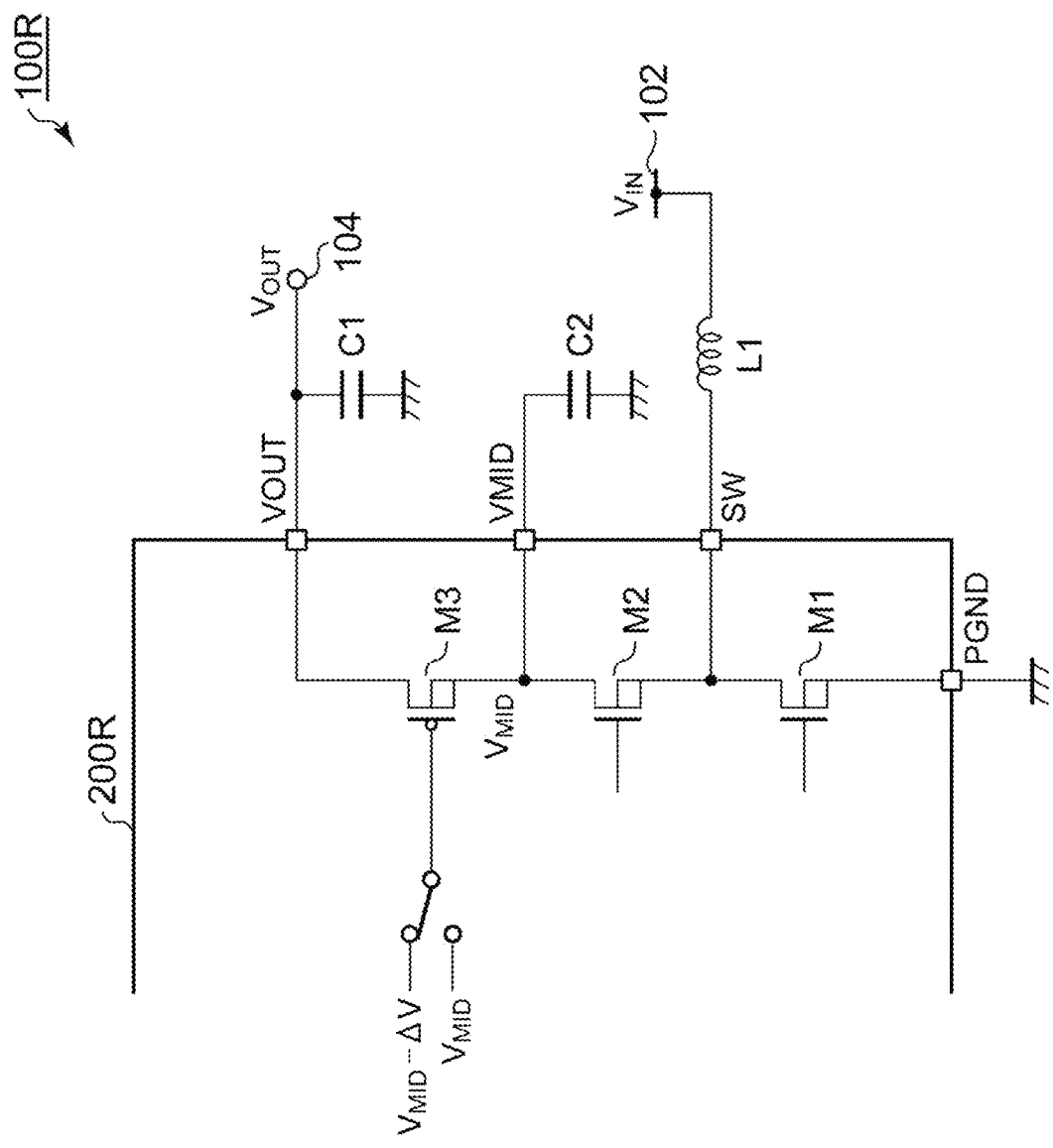
FIG. 10 is a circuit diagram of a DC/DC converter according to a comparative technique 1.

This completes the description of the operation of the DC/DC converter 100C. An advantage of the DC/DC converter 100C will become clear by comparison with a comparative technique 1. FIG. 10 is a circuit diagram of a DC/DC converter 100R according to the comparative technique 1. The voltage applied to the gate of the PMOS transistor M3 to stop the DC/DC converter varies between the comparative technique 1 and the configuration of FIG. 7. In the comparative technique 1, to immediately turn off the PMOS transistor M3, the voltage same as the source voltage $V_{MID}$ is applied to the gate such that the gate-source voltage of the PMOS transistor M3 becomes zero.

The PMOS transistor M3 is instantaneously turned off in the comparative technique 1, and the path of the coil current $I_L$ is cut off. The coil current $I_L$ continues to flow toward the source of the PMOS transistor M3. The source voltage $V_{MID}$ rises, and this may lead to an overvoltage state. The switching voltage $V_{SW}$ may also enter the overvoltage state when the source voltage $V_{MID}$ rises. Measures may need to be taken to suppress the overvoltage, such as providing a pin $V_{MID}$ on the source of the PMOS transistor M3 and connecting a capacitor C2 to the pin $V_{MID}$.

On the other hand, according to the configuration of FIG. 7, the source voltage $V_{MID}$ of the PMOS transistor M3 is clamped. The overvoltage is unlikely to occur, and the reliability is improved.

The overvoltage of the source voltage of the PMOS transistor M3 is suppressed in the configuration of FIG. 7, and measures for suppressing the overvoltage are not necessary. That is, there is no need to provide the pin $V_{MID}$ on the source of the PMOS transistor M3 and connect the pin $V_{MID}$ to the capacitor C2. Therefore, the configuration of FIG. 7 has an advantage over the comparative technique 1 in terms of cost.

Next, modifications related to the configuration of FIG. 7 will be described.

(Modification 1.1)

Although both the boost DC/DC converter and the linear regulator are provided in the current mode in FIG. 7, the configuration is not limited to this, and both the boost DC/DC converter and the linear regulator may be provided in the voltage mode. In this case, phase compensation circuits may need to be separately designed for the boost DC/DC converter and the linear regulator.

(Modification 1.2)

The boost DC/DC converter may be designed in the current mode, and the linear regulator may be designed in the voltage mode. In this case, the configuration may be changed by excluding the third error amplifier 276 and inputting the output signal $V_{ERR1}$ of the first error amplifier 212 to the gate of the PMOS transistor M3. Alternatively, a drive circuit and a level shifter for driving the gate of the PMOS transistor M3 based on the output signal $V_{ERR1}$ of the first error amplifier 212 may be added. In this case, phase compensation circuits may also need to be separately designed for the boost DC/DC converter and the linear regulator.

(Modification 1.3)

Although the voltage $V_C$ based on the input voltage $V_{IN}$ is applied to the gate of the PMOS transistor M3 in the third mode in FIG. 7, the gate-source voltage of the PMOS transistor M3 may be zero in the third mode as in the comparative technique 1. In this case, measures for an overvoltage may be taken, such as by adding a pin to the source of the PMOS transistor M3 and providing an external capacitor.

Second Embodiment

Figure 11:
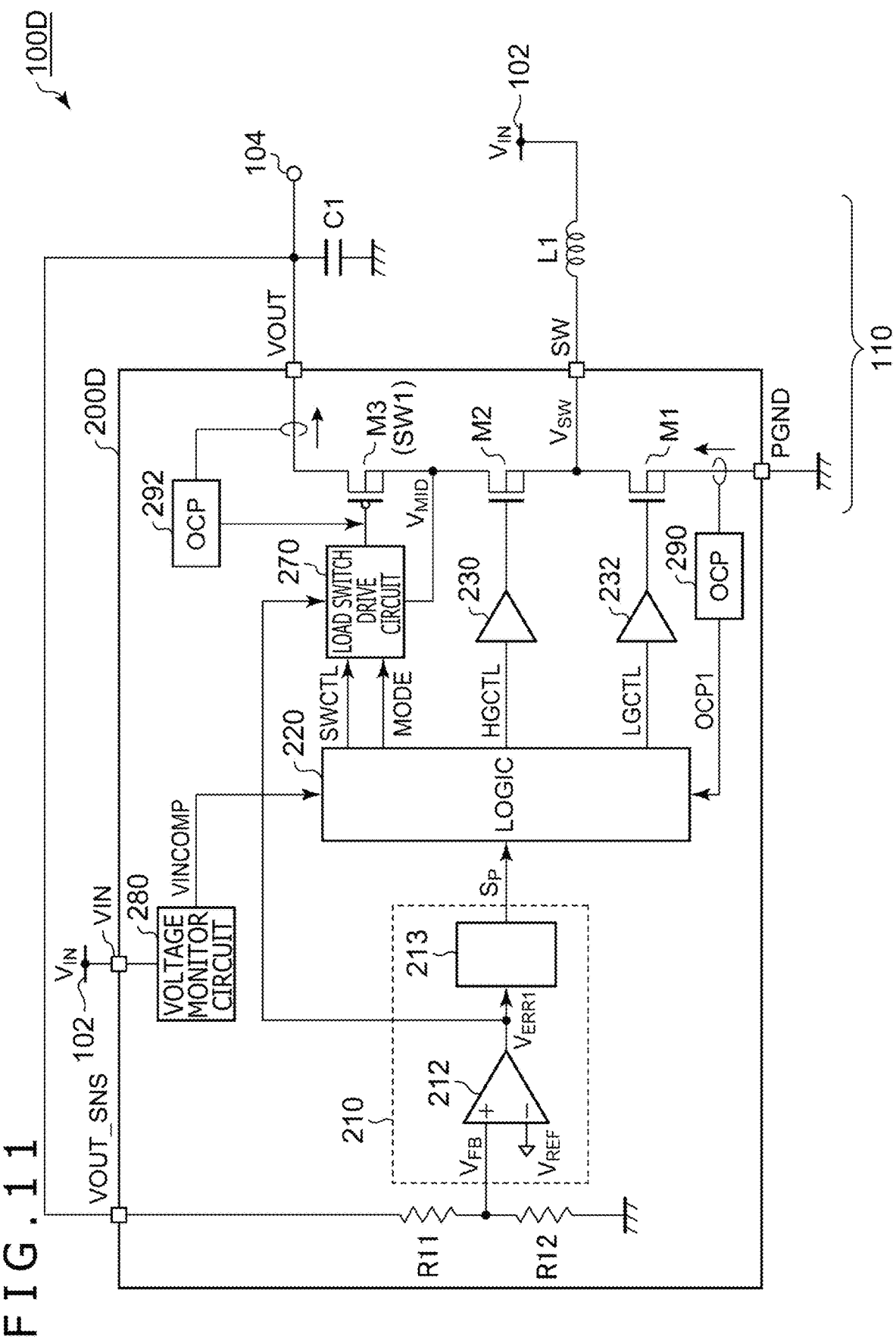
FIG. 11 is a block diagram of a DC/DC converter according to a second embodiment.

FIG. 11 is a block diagram of a DC/DC converter 100D according to a second embodiment. The second mode is selected in the overcurrent state in the second embodiment in addition to when the input voltage $V_{IN}$ exceeds the threshold voltage $V_{TH}$ as in the first embodiment.

A control circuit 200D includes a first overcurrent protection circuit 290 and a second overcurrent protection circuit 292 in addition to the control circuit 200C of FIG. 1.

The first overcurrent protection circuit 290 limits the current to prevent the current from exceeding a first threshold current $I_{OCP1}$ of the coil current $I_L$ flowing through the inductor L1 when the DC/DC converter 100D performs the boost converter switching operation. The first overcurrent protection circuit 290 may monitor the average current of the coil current $I_L$, may monitor the valley current, or may monitor the peak of the coil current $I_L$. The first overcurrent protection circuit 290 may perform what is generally called pulse-by-pulse overcurrent protection. For example, the first overcurrent protection circuit 290 asserts an overcurrent protection signal OCP1 when the coil current $I_L$ reaches the first threshold current. The logic circuit 220 immediately turns off the low side transistor M1 in response to the assertion of the overcurrent protection signal OCP1.

The second overcurrent protection circuit 292 limits the current to prevent the current $I_{OUT(LDO)}$ flowing through the PMOS transistor M3 from exceeding a second threshold current $I_{OCP2}$ when the DC/DC converter 100D operates as the linear regulator. For example, the second overcurrent protection circuit 292 reduces the gate-source voltage of the PMOS transistor M3 when the output current $I_{OUT(LDO)}$ exceeds the threshold current. The characteristics of the overcurrent protection of the second overcurrent protection circuit 292 may be what is generally called drooping characteristics or may be foldback characteristics.

In the second embodiment, the load switch drive circuit 270 operates in the second mode also in the following case in addition to when the input voltage $V_{IN}$ exceeds the threshold. Specifically, the load switch drive circuit 270 enters the second mode also when the duty cycle of the pulse signal $S_P$ has dropped to a predetermined value and there is an overcurrent. The logic circuit 220 can monitor the overcurrent protection signal OCP1 to determine whether or not there is an overcurrent. In the overcurrent state, the logic circuit 220 selects the second mode when the duty cycle (pulse width) of the low side control signal LGCTL has dropped to the minimum duty cycle (minimum pulse width).

This completes the description of the configuration of the control circuit 200D.

Figure 12:
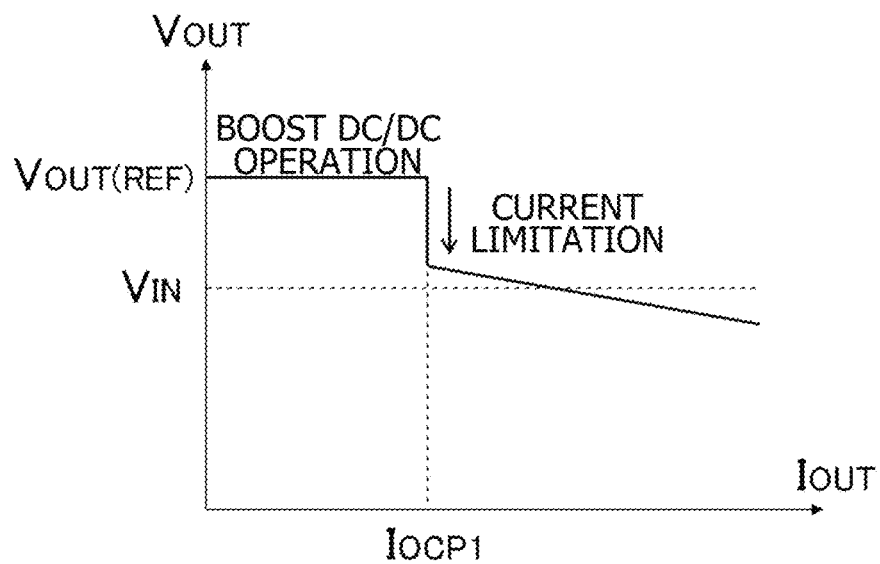
FIG. 12 depicts current-voltage (I-V) characteristics of the boost DC/DC converter.

Next, overcurrent protection in the boost DC/DC converter will be described. FIG. 12 depicts current-voltage (I-V) characteristics of the boost DC/DC converter. If there is an overcurrent during the switching operation of the boost DC/DC converter, the pulse width (duty cycle) of the low side control signal LGCTL starts to decrease due to pulse-by-pulse overcurrent protection. As a result, the coil current $I_L$ starts to decrease, and the output voltage $V_{OUT}$ also starts to drop. However, the minimum pulse width of the low side control signal LGCTL that can be generated is set in the control circuit 200D, and it is difficult to output a low side control signal LGCTL narrower than that. Therefore, the output voltage $V_{OUT}$ only drops to a voltage level slightly higher than the input voltage $V_{IN}$. $V_{OUT}$ is smaller than $V_{IN}$ in a situation where the output line 104 is shorted to ground. In this case, the current is not limited, and an overcurrent continues to flow.

Figure 13:
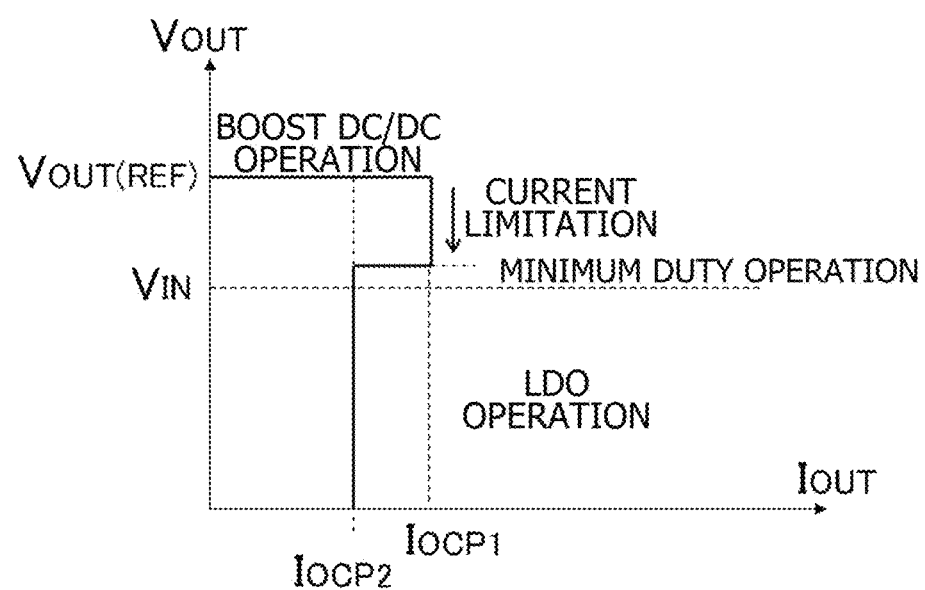
FIG. 13 is a diagram describing overcurrent protection of the DC/DC converter according to the second embodiment.

FIG. 13 is a diagram describing overcurrent protection of the DC/DC converter 100D according to the second embodiment. When overcurrent protection is applied during the operation of the boost DC/DC converter, the output voltage $V_{OUT}$ drops to a voltage level slightly higher than the input voltage $V_{IN}$ due to the overcurrent protection of the first overcurrent protection circuit 290. In this state, the duty cycle of the low side control signal LGCTL is the minimum value, and a minimum duty cycle operation is performed. Once the logic circuit 220 detects the minimum duty cycle, the logic circuit 220 switches the load switch drive circuit 270 to the second mode. As a result, the DC/DC converter 100D starts to operate as the linear regulator. During the operation as the linear regulator, the overcurrent protection is applied by the second overcurrent protection circuit 292. Therefore, the output voltage $V_{OUT}$ can be reduced while the output current $I_{OUT(LDO)}$ is suppressed to equal to or smaller than the threshold current $I_{OCP2}$.

Here, the second threshold current $I_{OCP2}$ may preferably be set lower than the first threshold current $I_{OCP1}$. In this way, the hysteresis of the first mode and the second mode can be set for the resistive load, and oscillation can be suppressed.

Figure 14:
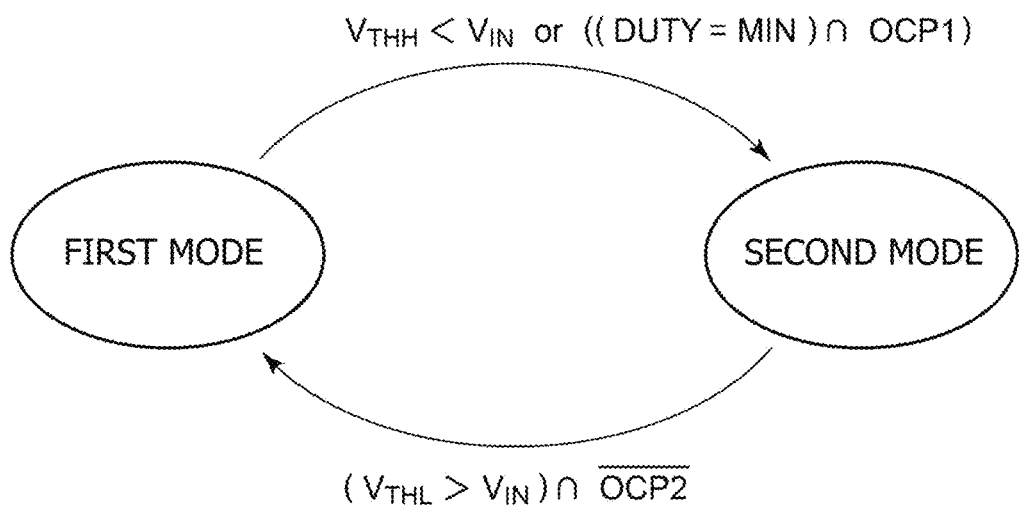
FIG. 14 is a state transition diagram of the DC/DC converter according to the second embodiment.

FIG. 14 is a state transition diagram of the DC/DC converter 100D according to the second embodiment. When $V_{IN}$ becomes larger than $V_{THH}$ in the first mode, the first mode is shifted to the second mode. When a duty cycle DUTY of the low side control signal LGCTL is a minimum value MIN and there is an overcurrent (OCP1 is asserted) in the first mode, the first mode is shifted to the second mode.

When $V_{IN}$ becomes smaller than $V_{THL}$ and there is no overcurrent (OCP2 is negated) in the second mode, the second mode is shifted to the first mode.

Third Embodiment

In the second embodiment, both the mode transition based on the input voltage $V_{IN}$ and the mode transition in the overcurrent state are performed. In a third embodiment, the mode transition based on the input voltage $V_{IN}$ is not performed, and only the mode transition in the overcurrent state is performed.

Figure 15:
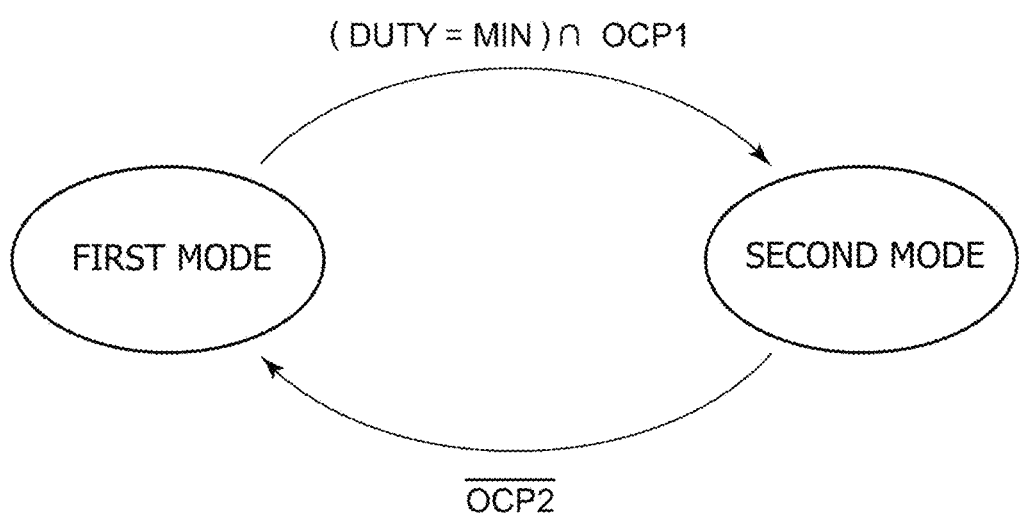
FIG. 15 is a state transition diagram of a DC/DC converter according to a third embodiment.

FIG. 15 is a state transition diagram of the DC/DC converter according to the third embodiment. When the duty cycle DUTY of the low side control signal LGCTL is the minimum value MIN and there is an overcurrent (OCP1 is asserted) in the first mode, the first mode is shifted to the second mode.

When there is no overcurrent anymore (OCP2 is negated) in the second mode, the second mode is shifted to the first mode.

The third embodiment is useful for a platform in which the input voltage $V_{IN}$ does not exceed the target level $V_{OUT(REF)}$ of the output voltage $V_{OUT}$.

(Modifications)

The embodiments are illustrative, and those skilled in the art will understand that there can be various modifications for the combinations of the constituent elements and the processes of the embodiments. The modifications will be described below.

In relation to the first to third embodiments, the low side transistor M1 and the high side transistor M2 may be provided as external discrete elements.

In relation to the first to third embodiments, the PMOS transistor M3 may be provided as an external discrete element. In this case, part or all of the load switch drive circuit 270 may be provided as a discrete element outside the IC of the control circuit 200C or 200D.

In relation to the second and third embodiments, the first overcurrent protection circuit 290 may detect the current flowing through the inductor L1 or may detect the current flowing through the high side transistor M2. The second overcurrent protection circuit 292 may detect the coil current flowing through the inductor L1.

(Usage)

Next, usage of the DC/DC converters 100C and 100D (hereinafter, simply referred to as the DC/DC converter 100) will be described.

Figure 16:
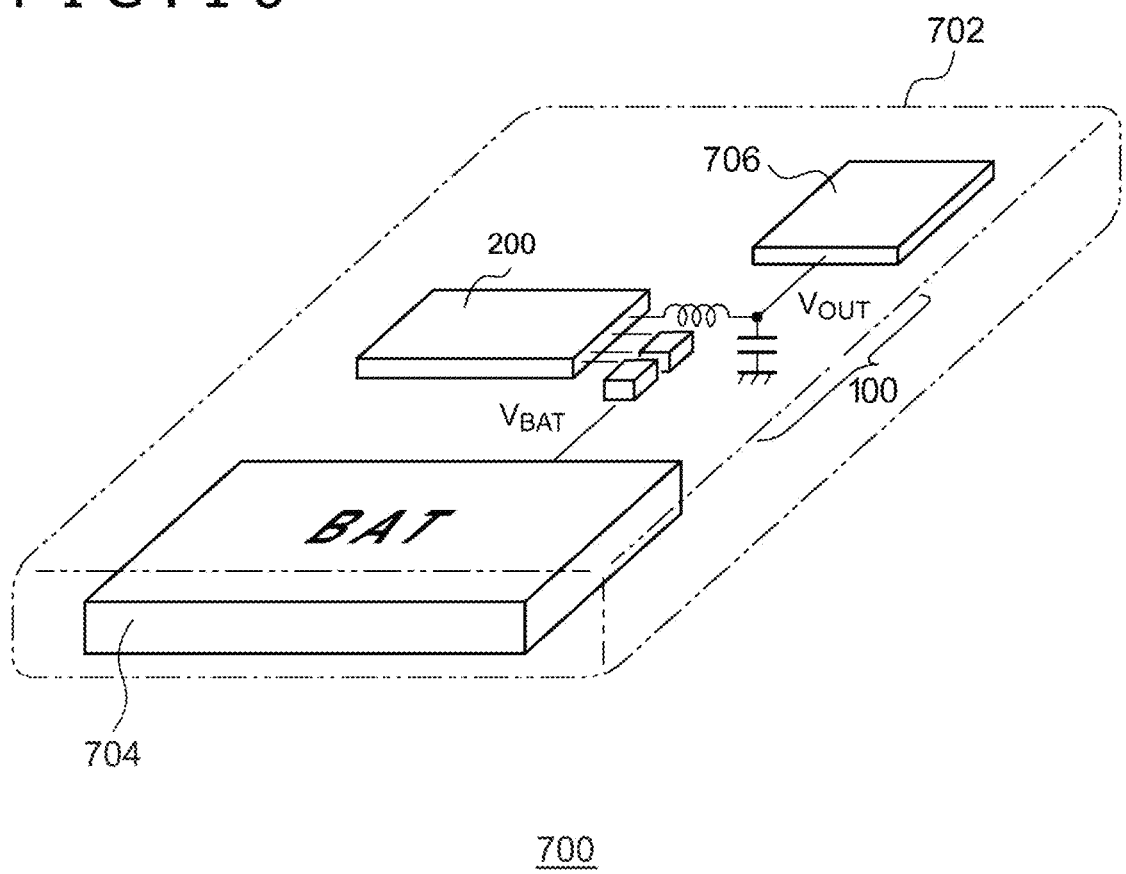
FIG. 16 depicts an example of an electronic device including the DC/DC converter according to the embodiments.

FIG. 16 depicts an example of an electronic device 700 including the DC/DC converter 100 according to the embodiments. The electronic device 700 is, for example, a battery-powered device such as a mobile phone terminal, a digital camera, a digital video camera, a tablet terminal, and a portable audio player. The electronic device 700 includes a housing 702, a battery 704, a microprocessor 706, and the DC/DC converter 100. The DC/DC converter 100 receives a battery voltage $V_{BAT}$ (=$V_{IN}$) from the battery 704 through its input terminal and supplies the output voltage $V_{OUT}$ to a load connected to its output terminal.

The type of electronic device 700 is not limited to the battery-powered device. The electronic device 700 may be an in-vehicle device, may be office automation (OA) equipment such as a facsimile, or may be industrial equipment.

The embodiments are illustrative, and those skilled in the art will understand that there can be various modifications for the combinations of the constituent elements and the processes of the embodiments and that the modifications can also be included in the present disclosure and the scope of the present technology.

What is claimed is:

1. A control circuit of a boost DC/DC converter including a high side transistor and a low side transistor, wherein DC/DC standing for direct-current/direct-current, the control circuit comprising: a pulse modulator including a first error amplifier that amplifies an error between a reference voltage and a feedback signal corresponding to an output voltage of the boost DC/DC converter, the pulse modulator being configured to generate a pulse signal with a pulse modulated according to an output signal of the first error amplifier; a logic circuit that generates a high side control signal and a low side control signal based on the pulse signal; and a load switch drive circuit that drives a load switch that is a PMOS transistor connected between the high side transistor and a load, wherein PMOS standing for p-channel metal-oxide semiconductor, wherein the load switch drive circuit is capable of making a switch between (i) a first mode for fully turning on the PMOS transistor and (ii) a second mode for supplying a drive voltage corresponding to the output signal of the first error amplifier to a gate of the PMOS transistor.

2. The control circuit according to claim 1, wherein the load switch drive circuit (i) enters the first mode when an input voltage of the boost DC/DC converter is lower than a predetermined threshold voltage and (ii) enters the second mode when the input voltage is higher than the threshold voltage.

3. The control circuit according to claim 2, wherein the threshold voltage is set in a range from 0.9 to 1.1 times a target level of the output voltage.

4. The control circuit according to claim 3, wherein the threshold voltage has hysteresis.

5. The control circuit according to claim 4, wherein both a higher threshold and a lower threshold of the threshold voltage having hysteresis are lower than the target level of the output voltage.

6. The control circuit according to claim 4, wherein both a higher threshold and a lower threshold of the threshold voltage having hysteresis are higher than the target level of the output voltage.

7. The control circuit according to claim 4, wherein a higher threshold of the threshold voltage having hysteresis is higher than the target level of the output voltage, and a lower threshold of the threshold voltage is lower than the target level of the output voltage.

8. The control circuit according to claim 1, further comprising:
a first current detection circuit that generates a first current detection signal indicating a coil current flowing through an inductor of the boost DC/DC converter when the boost DC/DC converter performs a switching operation; and
a second current detection circuit that generates a second current detection signal indicating a current flowing through the PMOS transistor when switching of the boost DC/DC converter is stopped, wherein
the pulse modulator further includes a second error amplifier that amplifies an error between the output signal of the first error amplifier and the first current detection signal, the pulse modulator generating the pulse signal with a duty cycle corresponding to an output of the second error amplifier, and
the load switch drive circuit includes a third error amplifier that amplifies an error between the output signal of the first error amplifier and the second current detection signal, the load switch drive circuit in the second mode supplying the drive voltage corresponding to an output signal of the third error amplifier to the gate of the PMOS transistor.

9. The control circuit according to claim 1, further comprising:
a first overcurrent protection circuit that limits a coil current flowing through an inductor to prevent the coil current from exceeding a first threshold current; and
a second overcurrent protection circuit that limits a current flowing through the PMOS transistor to prevent the current from exceeding a second threshold current in the second mode, wherein
the load switch drive circuit enters the second mode when a duty cycle of the low side control signal has dropped to a minimum value and there is an overcurrent.

10. The control circuit according to claim 9, wherein the second threshold current is lower than the first threshold current.

11. The control circuit according to claim 9, wherein the load switch drive circuit (i) enters the first mode when an input voltage of the boost DC/DC converter is lower than a predetermined threshold voltage and (ii) enters the second mode when the input voltage is higher than the threshold voltage, and
the load switch drive circuit transitions to the first mode when the input voltage is lower than the threshold voltage and there is no overcurrent in the second mode.

12. The control circuit according to claim 1, wherein the load switch drive circuit applies an on-voltage lower by a predetermined voltage range than a source voltage of the PMOS transistor to the gate of the PMOS transistor in the first mode.

13. The control circuit according to claim 1, wherein the load switch drive circuit enters a third mode to stop the boost DC/DC converter and applies a voltage corresponding to an input voltage of the boost DC/DC converter to the gate of the PMOS transistor.

14. The control circuit according to claim 1, wherein the control circuit is integrated into one semiconductor substrate.

15. A power supply circuit comprising: a main circuit of a DC/DC converter, wherein DC/DC standing for direct-current/direct-current; and the control circuit according to claim 1.

16. An electronic device comprising: the control circuit according to claim 1.

* * * * *